United States Patent [19]

Murakami

[11] 4,103,870

[45] Aug. 1, 1978

[54] INSTRUMENT FOR SETTING A NON-SKID CHAIN ON A CAR TIRE

[76] Inventor: Keisuke Murakami, 2-22-3 Megurohon-cho, Meguro-ku, Tokyo, Japan

[21] Appl. No.: 825,164

[22] Filed: Aug. 12, 1977

[51] Int. Cl.² .......................... E02C 3/00; B60C 27/00
[52] U.S. Cl. ...................... 254/88; 81/15.8; 152/213 R
[58] Field of Search ............. 254/88; 152/213 R; 81/15.8

[56] References Cited

U.S. PATENT DOCUMENTS

| 2,532,149 | 11/1950 | Cone | 254/88 |
| 3,856,264 | 12/1974 | Thumma | 254/88 |
| 3,937,263 | 2/1976 | Hill et al. | 254/88 |

FOREIGN PATENT DOCUMENTS

| 641,337 | 4/1928 | France | 254/88 |

Primary Examiner—Robert C. Watson
Attorney, Agent, or Firm—Haseltine, Lake & Waters

[57] ABSTRACT

An apparatus for setting a non-skid chain on a car tire comprises a bed adapted to be placed on the ground and having a mounting surface for placing the car tire thereon, the mounting surface having a plurality of grooves for putting the chain therein. The bed consists of first and second bed sections, the first and second bed sections respectively having a substantially flat and inclined surfaces for cooperating to form the mounting surface of the bed, the first and second bed sections having adjacent lower edges. A hinge is disposed between the adjacent lower edges of the two bed sections connecting the two bed sections for allowing the bed to be folded. Preferably, the two bed sections have lower surfaces respectively having recesses therein for cooperating to form an internal space which can accommodate car tools, such as the chain when the bed is folded.

7 Claims, 4 Drawing Figures

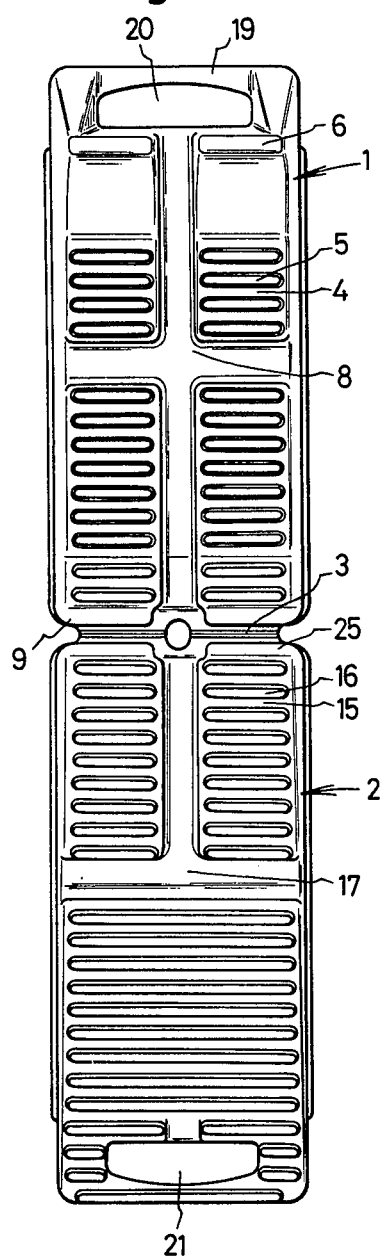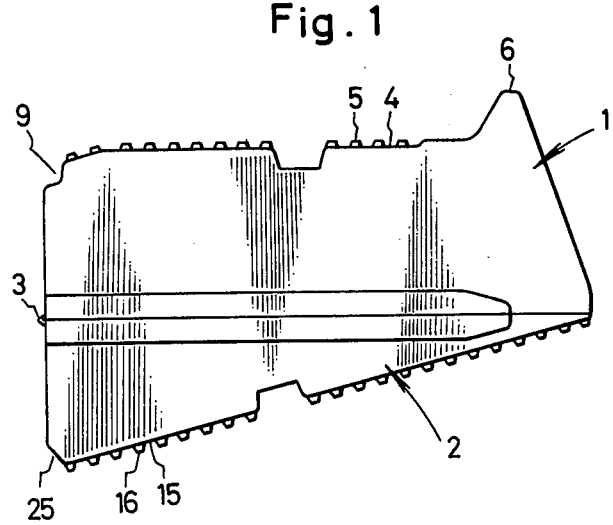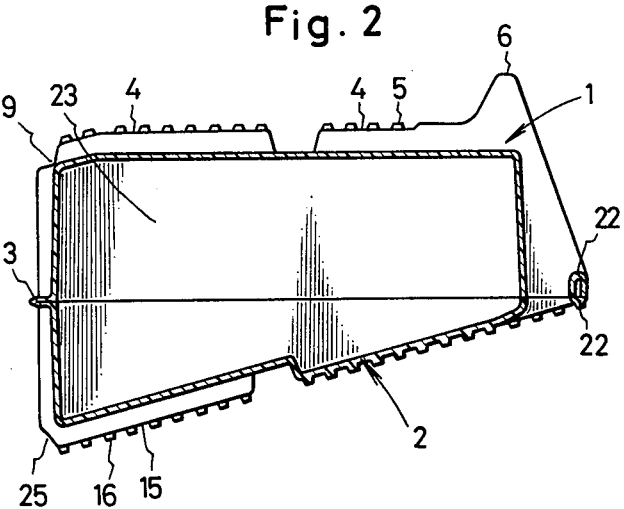

INSTRUMENT FOR SETTING A NON-SKID CHAIN ON A CAR TIRE

BACKGROUND OF THE INVENTION

The present invention relates to apparatus for setting a non-skid chain on a car tire, and more particularly, to a non-skid tire-chain setting bed, in which chains can be accommodated, to help in setting chains on tires.

In general, when road surfaces are frozen, it is of importance, from a viewpoint of safety, to prevent a car tire from slipping by winding a non-skid tyre-chain around the car tire. Reference is made to a conventional method of setting non-skid chain on a car tire. The step of setting the non-skid tire-chain on the car tyre includes spreading the non-skid tire-chain on a road surface, mounting the car tire on one end of the tire-chain by driving the car forwardly or in reverse, raising the other end of the tire-chain to wind the tyre-chain around the car tire, and connecting both ends of the tire-chain.

However, with the conventional method of setting the non-skid chain on a car tire stated above, various drawbacks are as follows:

Firstly, it is difficult to correctly wind the tire-chain around the tyre, since an undesirable movement of the non-skid tire-chain cannot be avoided when the car tire is mounted on the tyre-chain.

Secondly, it is to be noted that a revolutional force due to revolution of the car-tire results in deformation of a portion of the non-skid tire-chain. Therefore, mounting of the tire on the portion deformed causes the length of the non-skid tire-chain to be substantially short. This will make it impossible to connect both ends of the tire-chain.

Thirdly, it is inconvenient to carry the non-skid chain by hand, since the length of the chain is relatively long.

SUMMARY OF THE INVENTION

With the above in mind, an object of the present invention is to provide apparatus for mounting a non-skid chain on a car tire which makes it possible to correctly and easily mount the tire-chain on the car tire.

Another object of the present invention is to provide apparatus for mounting a non-skid chain on a car tire, wherein the tyre-chain does not undesirably move when the tire-chain is being on the car tyre.

Another object of the present invention is to provide apparatus for setting a non-skid chain on a car tire which makes it possible to facilitate the mounting of the non-skid chain on the car tire with the tire being raised by a predetermined height above the ground.

Another object of the present invention is to provide apparatus for mounting a non-skid chain on a car tire which makes it easy to carry car tools, such as non-skid chains by accommodating them in the apparatus.

According to the present invention, there is provided apparatus for mounting a non-skid chain on a car tire comprising a bed adapted to be placed on the ground and having a mounting surface for placing the car tire thereon, the mounting surface having a plurality of grooves for putting the chain therein, the bed consisting of first and second bed sections, the first and second bed sections respectively having substantially flat and inclined surfaces for cooperating to form the mounting surface of the bed, the two bed sections having adjacent lower edges, the apparatus further including hinge means disposed between the adjacent lower edges of the two bed sections connecting the two bed sections for allowing the bed to be folded.

BRIEF DESCRIPTION OF THE DRAWINGS

The features and advantages of the apparatus for mounting a non-skid chain on a car tire according to the present invention will become more apparent from the following description taken in conjunction with the accompanying drawings in which:

FIG. 1 is a side elevational view of a preferred embodiment of apparatus for mounting a non-skid chain on a car tire according to the present invention.

FIG. 2 is a longitudinal cross sectional view taken through the apparatus of FIG. 1.

FIG. 4 is a plan view of the apparatus of FIG. 3.

In the drawings, the same reference numerals indicate the same or similar elements of apparatus for mounting a non-skid chain on a car tire according to the present invention.

DETAILED DESCRIPTION OF PREFERRED EMBODIMENT

Figure 3:
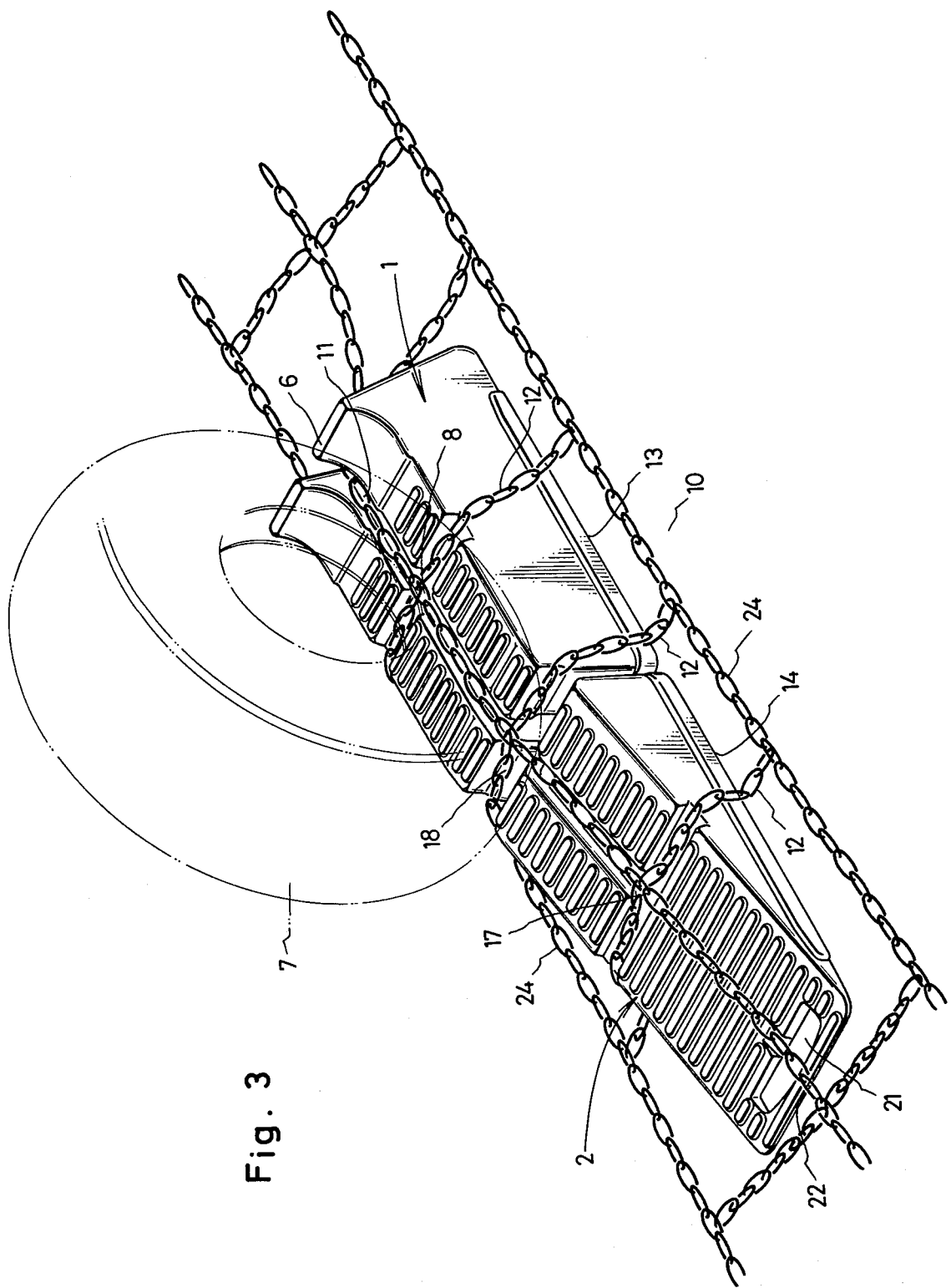
FIG. 3 is a perspective view showing the mounting of a non-skid chain on a car tire according to the present invention.

FIG. 3 shows a perspective view of the apparatus for mounting a non-skid chain on a car tire according to the present invention.

As seen from FIG. 3, the apparatus employed in the present invention is composed of a bed adapted to be placed on the ground and having a mounting surface for placing a car tyre 7 thereon. The mounting surface 2 is provided with a plurality of grooves 8 for putting the chain 10 therein. The bed essentially consists of first and second bed sections 1 and 2, which respectively have substantially flat and, for cooperating to form the mounting surface of the bed. The two bed sections 1 and 2 are provided with adjacent lower edges. The apparatus further includes hinge means 3 disposed between the adjacent lower edges of the two bed sections 1 and 2 and hingedly connecting the two bed sections 1 and 2 for allowing the bed to be folded. Referring to FIGS. 1 and 2 showing the bed is folded to form a box-shaped instrument, the two bed sections have lower surfaces which are respectively provided with recesses therein cooperating to form an internal space 23 which can accommodate car tools, such the chain when the bed is folded.

In more detail, as stated above, the two bed sections 1 and 2 are interconnected by the hinge 3. The second bed section 2 is regarded as a cap or lid for the first bed section 1 when the bed is folded. As shown in FIG. 3, in setting the non-skid tire chain 10 on the car tire, the first and second bed sections 1 and 2 are unfolded and placed on the ground in such a manner that the hinge 3 is disposed between two bed sections 1 and 2. The first and second bed sections 1 and 2 and the hinge 3 are formed by means of, for example, injection molding. The first bed section 1, which is rectangular in cross section has an upper surface 4 on which a plurality of small and relatively low projections 5 are successively formed in the longitudinal direction thereof. The upper surface 4 is further provided at the one end thereof with a relatively high projection 6 projecting upwardly. It will be understood that the plurality of projections 5 prevent the car-tire from slipping, while the projection 6 prevents the car-tire 7 from slipping off. The upper surface 4 is further provided on the surface thereof with an X-shaped groove 8 and with a step portion 9.

A center chain 11 and a cross chain 12 are disposed in the groove 8 and the step portion 9, respectively. The depth of the groove 8 and the step portion 9 are selected in such a manner that chains 11 and 12 are not exposed above the surface of the bottom portion 4. Furthermore, it is also to be noted that this depth is selected so as enough to easily move chains 11 and 12 when the car tyre 7 is on the upper surface 4. The first bed section 1 is provided with the recess therein at the bottom surface and an opening therein can be brought into contact with an opening 14 provided the second bed section 2 when the bed is folded to form internal space 23.

The second bed section 2, which is substantially triangular in cross section, is provided with an inclined surface 15 constituting the mounting surface. When the two bed sections 1 and 2 are disposed in such a manner that the openings at the bottom surfaces are facing the ground, the mounting surface is formed, on which the car-tire 7 can ascend to the top of the upper surface on the first bed section 1.

The second bed section 2 is further provided, on the inclined surface with a plurality of small projections 16 for preventing slip and a T-shaped groove 17 wide enough to accommodate the center chain 11 and the cross chain 12 of the non-skid tyre-chain 10. The second bed section 2 is further provided with the inner therein and is provided at one end thereof with a step portion 25. The step portions 25 and 9 cooperatively form groove 18 for accommodating the cross chain 12 therein when the bed is folded open.

The first bed section 1 is provided in direction the and opposite the hinge 3 with a flange 19 in which a hole 20 is provided to receive four fingers therein. Likewise, the second bed section 2 is provided at the end opposite the hinge 3 with a hole 21 the shape of which is the same as the hole 20 in the first bed section 1. When the bed B is folded at the hinge 3, the holes 20 and 21 overlap each other. It will be understood that the formation of the holes 20 and 21 can serve as a grip 22 for the folded bed. Therefore, by engaging the grip 22 one can easily carry the instrument with the non-skid chain 10 accommodated.

Reference is now made to the use of the instrument for setting non-skid tire-chain on a car tyre according the present invention.

Initially, the two bed sections 1 and 2 are spread open and disposed in such a manner that the openings of the recesses are in contact with the ground. The center chain 11 and the cross chains 12 of the non-skid chain 10 are disposed in the grooves 8, 17 and 18. The non-skid chain 10 is spread in such a manner that a side length 24 of the chain 10 is positioned at both sides of the two bed sections 1 and 2. Then, the car-tire 7 is moved by driving the car from the ground onto the upper surface 4 of the first bed section 1 via the slanting surface of the second bed section 2. The car-tire 7 is then stopped on the upper surface 4 of the first bed section 1. An adjustment of the non-skid chain 10 with respect to the car-tire 7 is carried out by suitably moving the center chain 11 and the cross chains 12 of the non-skid chain 10 within the grooves 8, 17 and 18. Then, the non-skid chain 10 is wound around the car-tire 7 to connect both ends thereof. The setting of the non-skid chain 10 on the car-tire 7 is thus preferably accomplished.

The non-skid chain 10, as best shown in FIG. 2 can be accommodated within the internal space 23 formed when the bed is folded. It is also possible to accommodate and keep any other car tools within the internal space 23.

As will be obvious from the foregoing description, the instrument for mounting the non-skid chain on a car tire according to the present invention will provide the following advantages:

a. Since the car-tire 7 can be placed on the non-skid chain 10 which is put in a plurality of grooves provided on the surface of the first and second bed sections 1 and 2, an undesirable movement of the tire-chain 10 can be avoided when the car-tire 7 is mounted on the non-skid chain.

b. Since it is possible to adjust the position of the chain 10 with the car-tire 7 mounted on the tire-chain 10, it will be possible to correctly and quickly wind the tire-chain 10 around the car-tyre 7.

c. Since it is possible to carry out the winding of the tire-chain 10 under the condition that the car-tire 7 is mounted on the first bed section 1 with the car-tire 7 being raised at a predetermined height from the ground, the winding of the tire-chain 10 is extremely facilitated.

d. Since an undesirable advancing of the car-tire 7 is prevented by the projections on the first bed section 1, slipping of the car-tire 7 from the first bed section 1 is positively prevented.

e. Since car tools, such as chains can be accommodated within the internal space 23 formed when the bed is folded, while additionally the grip 22 is formed at the folded end of the bed it is quite easy to carry the instrument by hand in which the car tools are accommodated.

It is to be understood that modifications and variations of the embodiment of the present invention disclosed herein may be resorted without departing from the spirit and the scope of the invention as defined by the appended claims.

I claim:
1. Apparatus for mounting a chain on a tire comprising:
 (a) a bed adapted to be placed on the ground and having a mounting surface for placing the tire thereon, said mounting surface having a longitudinal groove and a plurality of transverse grooves therein for placing a chain therein,
 (b) said bed consisting of first and second bed sections respectively having flat and inclined surfaces cooperating to form said mounting surface of said bed, said grooves in said mounting surface of the bed defining perpendicularly intersecting grooves in both the flat and inclined surfaces of said bed sections,
 (c) said grooves being of sufficient size to allow said chain to be accommodated therein for longitudinal and transverse movement with the tire on the mounting surface,
 (d) said first and second bed sections having adjacent lower surfaces, said apparatus further including hinge means disposed between said adjacent lower surfaces of said two bed sections and hingedly connecting said two bed sections for allowing said bed to be folded.

2. Apparatus as claimed in claim 1, wherein said two bed sections have recesses therein cooperating to form an enclosed internal space for accommodating the car chain therein when said bed is folded.

3. Apparatus as claimed in claim 2, wherein said first bed section is rectangular in longitudinal cross section and said second bed section is triangular in longitudinal cross section.

4. Apparatus as claimed in claim 2 which further comprises a plurality of projections on said mounting surface of said bed for preventing said tire from slipping thereon.

5. Apparatus as claimed in claim 2 comprising a vertical projection on said mounting surface of said first bed section for preventing said tire from leaving said first bed section in a direction away from the second bed section.

6. Apparatus as claimed in claim 2 comprising grip means on said bed sections provided with openings which cooperatively overlap one another when said bed is folded to enable the folded bed to be carried manually.

7. Apparatus as claimed in claim 2 wherein said bed sections have respective steps to define one of said transverse grooves with the bed unfolded into operative position.

* * * * *